Fig. 2

Dec. 15, 1931.  M. J. GOLDBERG  1,836,236
INTERNAL COMBUSTION ENGINE
Filed April 19, 1926   9 Sheets-Sheet 5

Fig. 5

INVENTOR  MORRIS J. GOLDBERG
BY ATTORNEY

Dec. 15, 1931.  M. J. GOLDBERG  1,836,236
INTERNAL COMBUSTION ENGINE
Filed April 19, 1926    9 Sheets-Sheet 8

INVENTOR
MORRIS J. GOLDBERG
BY
ATTORNEY

Patented Dec. 15, 1931

1,836,236

UNITED STATES PATENT OFFICE

MORRIS J. GOLDBERG, OF BELOIT, WISCONSIN, ASSIGNOR TO FAIRBANKS, MORSE & CO., OF CHICAGO, ILLINOIS, A CORPORATION OF ILLINOIS

INTERNAL COMBUSTION ENGINE

Application filed April 19, 1926. Serial No. 103,034.

My invention relates to improvements in internal combustion engines and more particularly to engines of the injected fuel type having compressed air starting means adapted to operate in combination therewith.

In oil engines of the type described it is necessary for the operation of the engine to employ, governor mechanism of some form, injection pumps and operating means therefor, means for supplying fuel to the injection pumps, means for circulating lubricating oil, air start valves or the like, and means for operating and controlling them, and starting and stopping means. All of such mechanisms are, of necessity, operated from the crank shaft of the engine and are, therefore, to a high degree inter-connected and interdependent.

My invention comprises means for operating the above mechanisms in combination from the crank shaft of the engine and in close connection within a common housing, thereby providing for a minimum number of interconnecting parts, ease of assemblage and repair and the elimination of a considerable amount of piping, pump rods, and the like, heretofore necessary for the operation of these mechanisms.

My invention also comprises a novel arrangement of injection pumps, a governor control and suction valves therefor, together with operating means adapted to co-operate with the governor mechanism.

My invention also comprises lubricating oil circulating means operated in the same housing with said governor and injection pumps.

My invention also comprises a novel arrangement of air starting valves, and operating means in a common assemblage with the pumps and governor mechanism and manual and automatic means for controlling the same.

Further objects and advantages of my invention will appear from the following drawings and description thereof.

My invention is not limited to the exact construction and operation of the devices described, but includes the use of equivalent devices and combinations which perform substantially the same functions. Neither is my invention limited to the conjoint or combined use of the elements described, but involves also their use separately, as indicated in the concluding claims.

Referring by numerals to the drawings, 15 designates the cylinders of an internal combustion engine which may be of any suitable type having a base 16. It will be understood that while I show but one cylinder of a multi-cylinder vertical type engine for the sake of illustration, I do not limit myself to any number of cylinders or any particular type of engine since it will be evident that my invention will apply to any type of engine having any number of cylinders. 18 designates a force feed lubricator which may be of any suitable type and which is preferably driven by some means such as arm 19. Suitable oil pipes such as 18', serve to connect the lubricator with various bearing points of the engine. A housing 20 (see Fig. 2), is preferably situated at one end of the crank shaft, and preferably contains the pumping mechanism which will be described later. Housing 20 preferably has attached to it a housing 22 for the purpose of containing the governor mechanism which will be more fully described later. Housing 22 preferably makes an oil tight fit with housing 20 and the two housings preferably form a chamber about the end of crank shaft 23. A main bearing 24 which may be of any suitable type is preferably provided adjacent the end of the crank case 25. A sealing ring 26, (Fig. 2), is also preferably provided about the crank shaft 23 for the purpose of sealing the crank case 25 where the shaft passes through. Some means for lubricating bearing 24 is preferably provided, such as oil ring 27 dipping into oil reservoir 28. A cap 29 may be provided to make bearing 24 accessible. Reservoir 30 in housing 20 is preferably filled with lubricating oil maintained at a constant level by means of drain 31. An opening 32 from reservoir 28 serves to keep the oil level in reservoir 28 the same as that in reservoir 30 and an opening 33 between reservoir 30 and reservoir 34 in housing 22 serves to keep the level of oil in reservoir 34 the same as that in reservoir 30.

The governor mechanism hereinafter referred to, is described and claimed in detail in my divisional application filed July 1, 1927, and bearing Serial No. 202,957. A sleeve 35 is preferably fitted over the end of crank shaft 23, as best appears from Fig. 2, and attached thereto by some means such as bolts 36 screwed into the end of the shaft. These bolts preferably pass through curved slots 37 (Fig. 3) in the end of sleeve 35 so that by loosening the bolts the sleeve may be rotated about the shaft 23. A cam 38 (Fig. 2) is preferably carried by sleeve 35 for the purpose of operating the injection pump plungers 39 through rollers 40 in a manner which will be described more fully later. It is evident, however, that the time of operating these rollers through cam 38 will be determined by the position of sleeve 35 on shaft 23 and that by making the position of this sleeve adjustable through the medium of slots 37 and bolts 36, I provided a very simple and positive means for adjusting the timing of the injection periods for the various cylinders. Cam 41 is preferably rotatably mounted upon sleeve 35 and operates the suction valves 42 for injection pumps 39 through rollers 43. The position of cam 41 on sleeve 35 determines the time of closing of the valves 42 and, consequently, the amount of fuel injected into the cylinders of the engine. This position of cam 41 is determined by governor weights 44 preferably pivoted at 44' on projections 45 on sleeve 35, (see Fig. 3). These weights are preferably connected to cam 41 by means of links 46 attached to cam 41 by means of pins 47. The centrifugal action of the governor weights 44 is preferably opposed by governor springs 49, and as a means for adjusting the tension of these springs and hence the action of the governor, I prefer to use some means such as nut 50, to which one end of the spring is attached, and adjustable bolt 51. A removable cap 52 in housing 22, (see Fig. 2), serves to make these bolts accessible for adjustment. It will be seen that as the weights fly outward under the action of centrifugal force they will rotate cam 41 about sleeve 35 and thereby vary the time of contact of cam 41 with rollers 43 which will, in turn, vary the time of closing of suction valves 42 in a manner which will be more fully described later. By this means I am able to simply and positively control the speed of the engine under a varying load, and by merely removing the housing 22 and the bolts 36, the whole governing mechanism together with cams 38 and 41 may be removed for inspection. Due to opening 33, reservoir 34 will be full of lubricating oil to a level even with the top of drain 31 so that weights 44 in revolving will dip into the oil and throw it about the housings 20 and 22, thereby copiously lubricating the governing mechanism and pump and valve operating mechanism.

Figure 1:
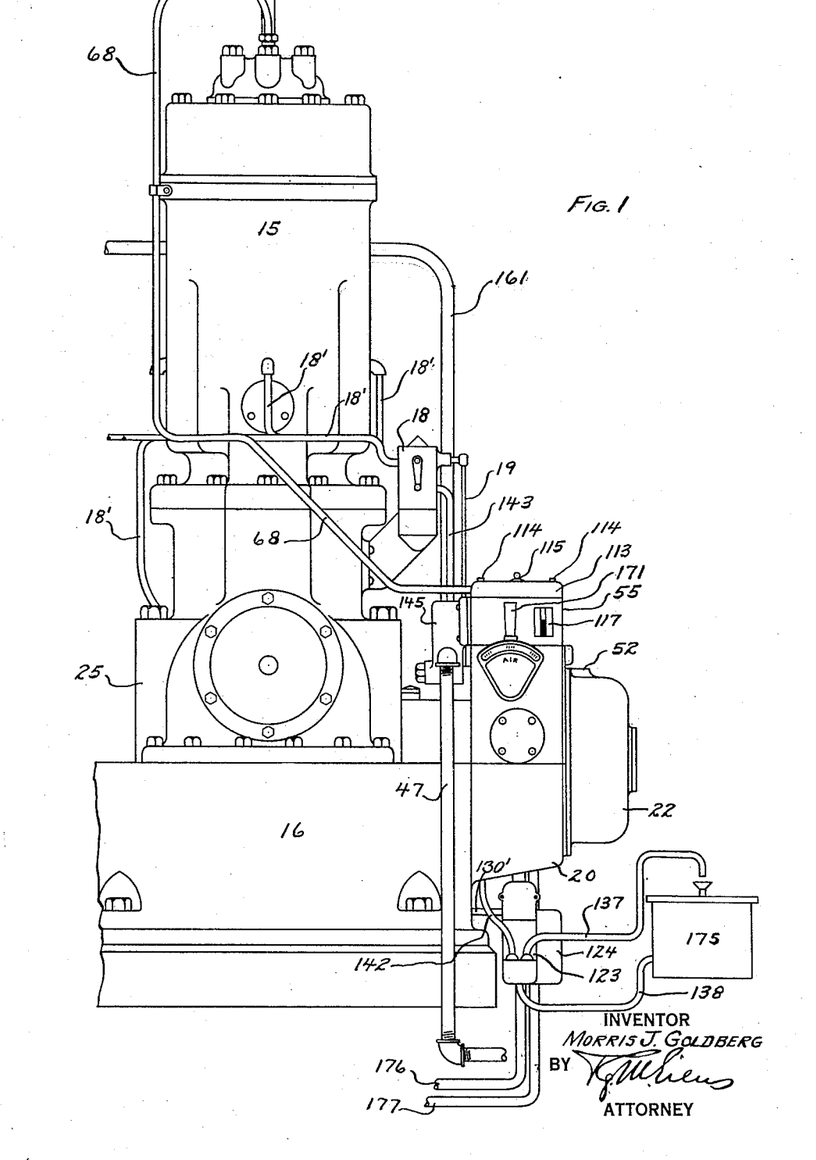
Fig. 1 is an elevational view of one end of an internal combustion engine to which an improved form of my invention has been applied.
Figure 2:
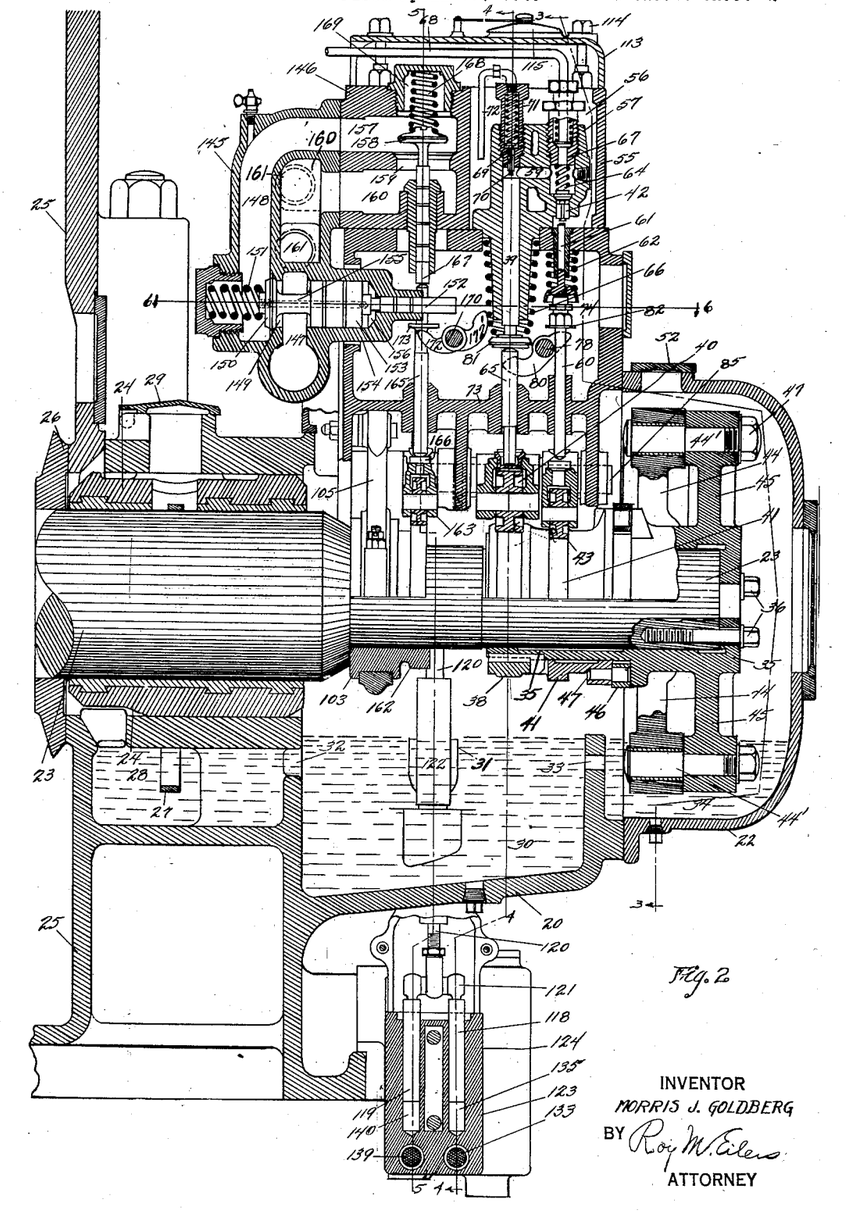
Fig. 2 is a fragmentary sectional elevation showing an improved form of pumps and pumping mechanism and governor mechanism, as shown in Fig. 1.

The injection pump mechanism, hereinafter referred to, is described and claimed in detail in my divisional application filed July 1, 1927, bearing Serial No. 202,956. Above housing 20 and attached thereto is preferably positioned a container 55, (see Figs. 2, 3 and 4) having a fuel oil chamber 56 and into which project the barrels 57 of the injection pump plungers 39 and suction valves 42. This chamber 56 is preferably kept continuously full of fuel, during the normal operation of the engine, by means of a fuel supply pump which will be described later. The level of the fuel in chamber 56 is determined by means of an overflow drain 58 (Fig. 4) and is preferably such that the injection pumps and valves are completely submerged in the fuel oil. Fuel is sucked into pulsation chambers 59 of the injection pumps (Fig. 2) through suction valves 42 which are operated by cam 41 through rollers 43, valve rod 60 and valve tappet 61 working against the pressure of spring 62. (See Fig. 8). From the shape of cam 41 it will be seen that valves 42 are held open at all times excepting when rollers 43 drop into depression 63 in the surface of the cam. It is evident that by controlling this time of closing of the valves 42, the quantity of fuel injected, and hence the speed of the engine, will be controlled and that this time of closing will be determined by the relative position of cam 41, on sleeve 35, with respect to cam 38 which operates the plungers 39. This relative position of cam 41 is controlled by means of the governor mechanism previously described. Plungers 39 are operated by cam 38 through rollers 40 and tappets 65 against the pressure of spring 66 (Fig. 2). On the injection stroke of the plungers 39 the fuel sucked into chamber 59 will be forced out through outlet valves 67 into pipes 68 leading to cylinders 15 (Figs. 1 and 2). For abrupt termination of the injection period the use of some form of by-pass valve is suggested such as the one shown at 69, in Fig. 2, and having a stem 70. The fuel remaining in chamber 59 after the injection stroke is thereby passed through conduit 72 into chamber 56. It is evident that under certain conditions of load the suction valves 42 will also act as by-pass valves in order to determine the period of injection. As a means for catching any leakage of fuel oil down past the plungers 39 and tappets 61, I prefer to employ a partition 73, (see Figs. 2, 4 and 5), having suitable bushings through which the tappets 65 and rods 60 may act, and forming a leakage chamber 74, having a drainage outlet at 75, (Fig. 4), back into the source of fuel supply (not shown). This outlet 75 is preferably joined with passageway 76 leading from drain 58 by means of a suitable fitting such as that shown at 77, which is connected to an overflow fuel return pipe 177. (See Figs. 1, 3 and 4).

Figure 3:
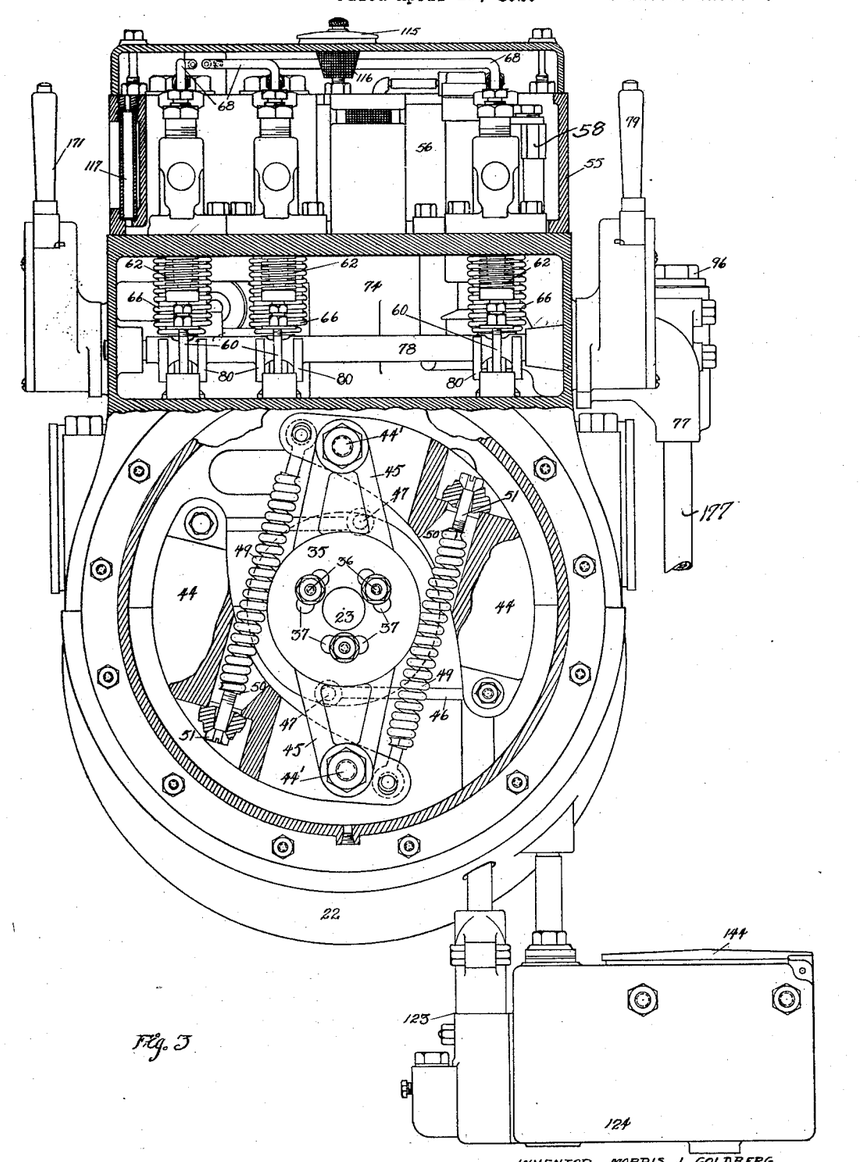
Fig. 3 is a sectional end view taken along the line 3—3 in Fig. 2 and shows the governor mechanism.

As a means for stopping the engine and for manually operating the plungers 39 for starting, I prefer to use some means such as shaft 78 controlled by lever 79 and carrying double-ended tappets 80, (Figs. 2 and 3). These tappets are so arranged that when the lever is placed in the neutral position the tappets are in out-of-action position as shown in Fig. 2. When shaft 78 is rotated in a clockwise direction (Fig. 2) by lever 79, one end of the tappet 80 will contact with shoulder 81 on plunger 39 and by rotating the shaft further the plunger will be pushed up into barrel 57 and fuel will be forced into pipes 68. The suction stroke is accomplished by means of spring 66 upon releasing the lever 79 and by repeating this operation as much oil as desired for starting may be pumped into the cylinders. During the running of the engine the tappets 80 are returned to their neutral position. When it is desired to stop the engine the shaft 78 is rotated in a counter clockwise direction (Fig. 2) by lever 79 until the opposite end of tappets 80 contacts with shoulders 82 on rods 60, thereby opening the suction valve and cutting off the fuel from the engine.

Rollers 40 through which the injection pump plungers are driven, may be carried in any suitable manner such as by members 84 pivoted on pins 85 and having a contacting surface 86. (See Fig. 4). Springs 87 serve to keep these contacting surfaces in contact with the ends of tappets 65 at all times. It is evident that for multi-cylinder engines these members 84 may be of different shapes as shown in order to facilitate the operation of the rollers when placed at various positions about the crank shaft. It is also evident that the same type of roller mechanism may be employed to carry the suction-valve rollers 43 and also the air-start valve rollers which will be described later.

The fuel supply system, hereinafter referred to, is described and claimed in detail in my divisional application filed July 1, 1927, bearing Serial No. 202,956. As a means for supplying fuel to chamber 56, I prefer to employ a fuel supply pump (see Fig. 5), having a plunger 90 operating in barrel 91 which preferably projects into chamber 56 and which has a pulsation chamber 92 resident therein. The fuel is sucked into chamber 92 through opening 92', removable strainer 93, passageway 94 and suction valve 95 which may be of any suitable type. Opening 92' is adapted to be connected to a source of fuel supply through conduit 176, (Figs. 1 and 5), and I prefer to have the fuel supply opening and strainer 93 resident in fitting 77 (Fig. 5), which also contains the outlets for drainage passageways 75 and 76 as above described. A removable plug 96 serves to retain strainer 93 which is held in place by spring 96'. A plug 97 preferably serves as an adjustment for valve 95. The outlet from chamber 92 is preferably through outlet valve 98, which may be of any suitable type, passageway 99 in removable cap 100, conduit 101 and strainer 102 into chamber 56. Conduit 101 is preferably attached to cap 100 and preferably carries strainer 102 so that by removing cap 100, conduit 101 and strainer 102 will be detached with it, thereby facilitating inspection and cleaning, and simplifying assembly. The fuel supply pump is preferably of such a capacity as to supply a surplus of fuel to chamber 56, the overflow passing out through drain 58 and pipe 177 (Fig. 4), as previously described.

Figure 4:
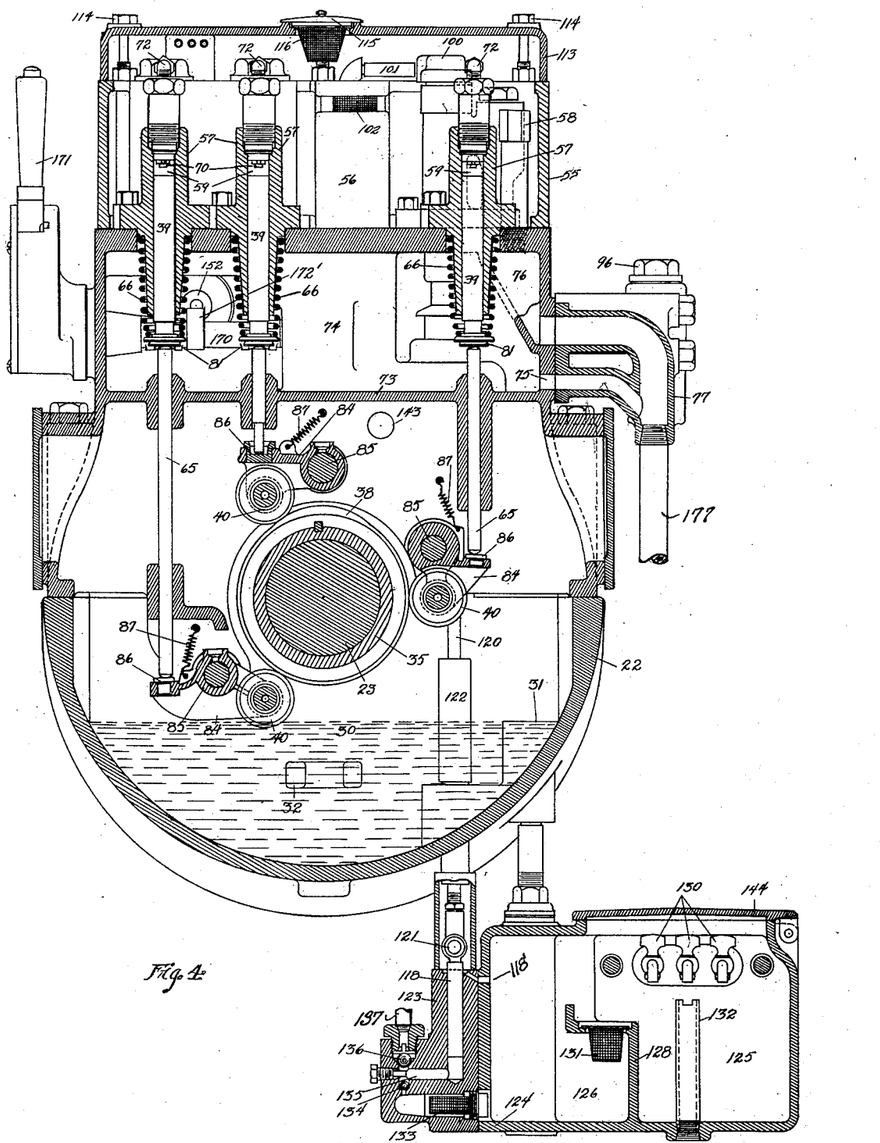
Fig. 4 is a sectional end view taken along the line 4—4 in Fig. 2, showing the injection pumps.
Figure 5:
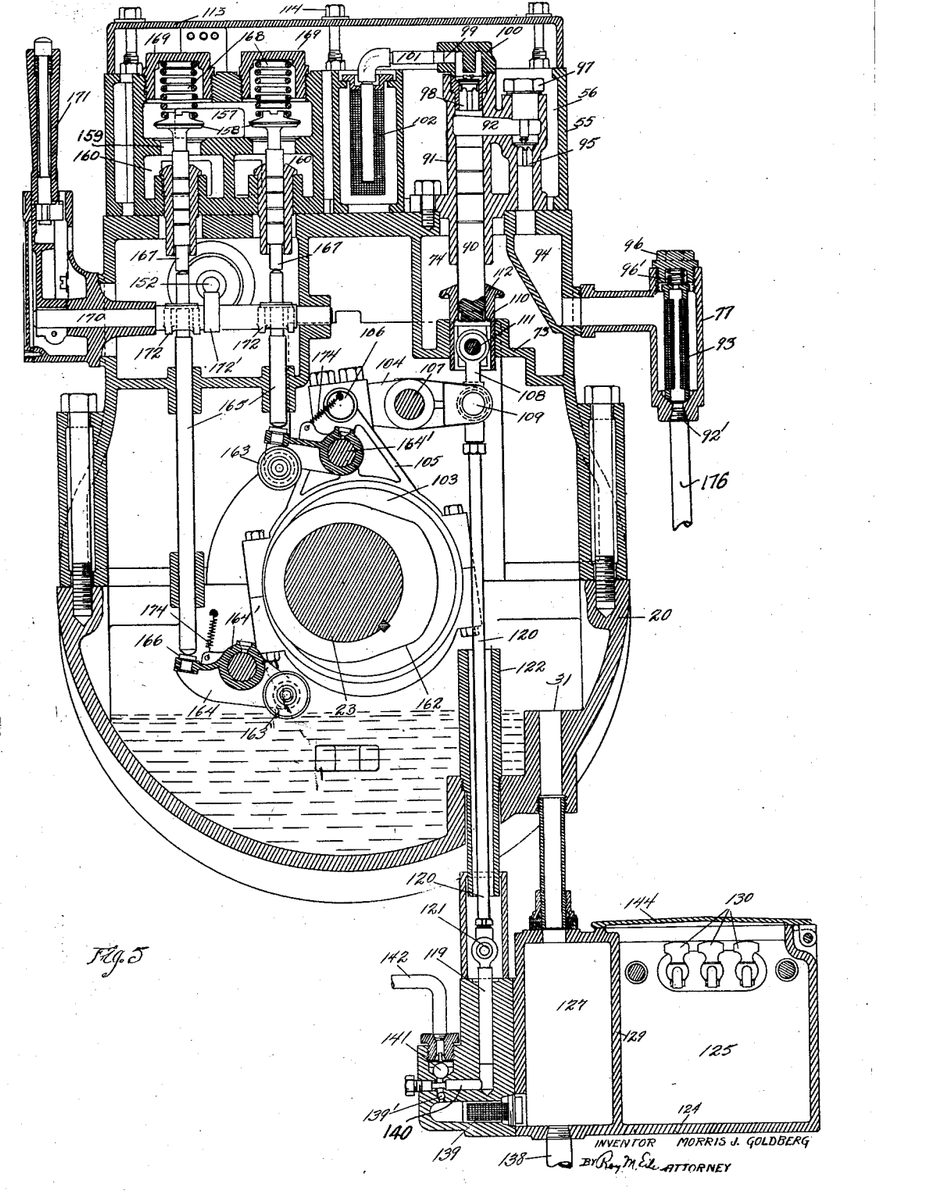
Fig. 5 is a sectional end view taken along the line 5—5 in Fig. 2.
Figure 10:
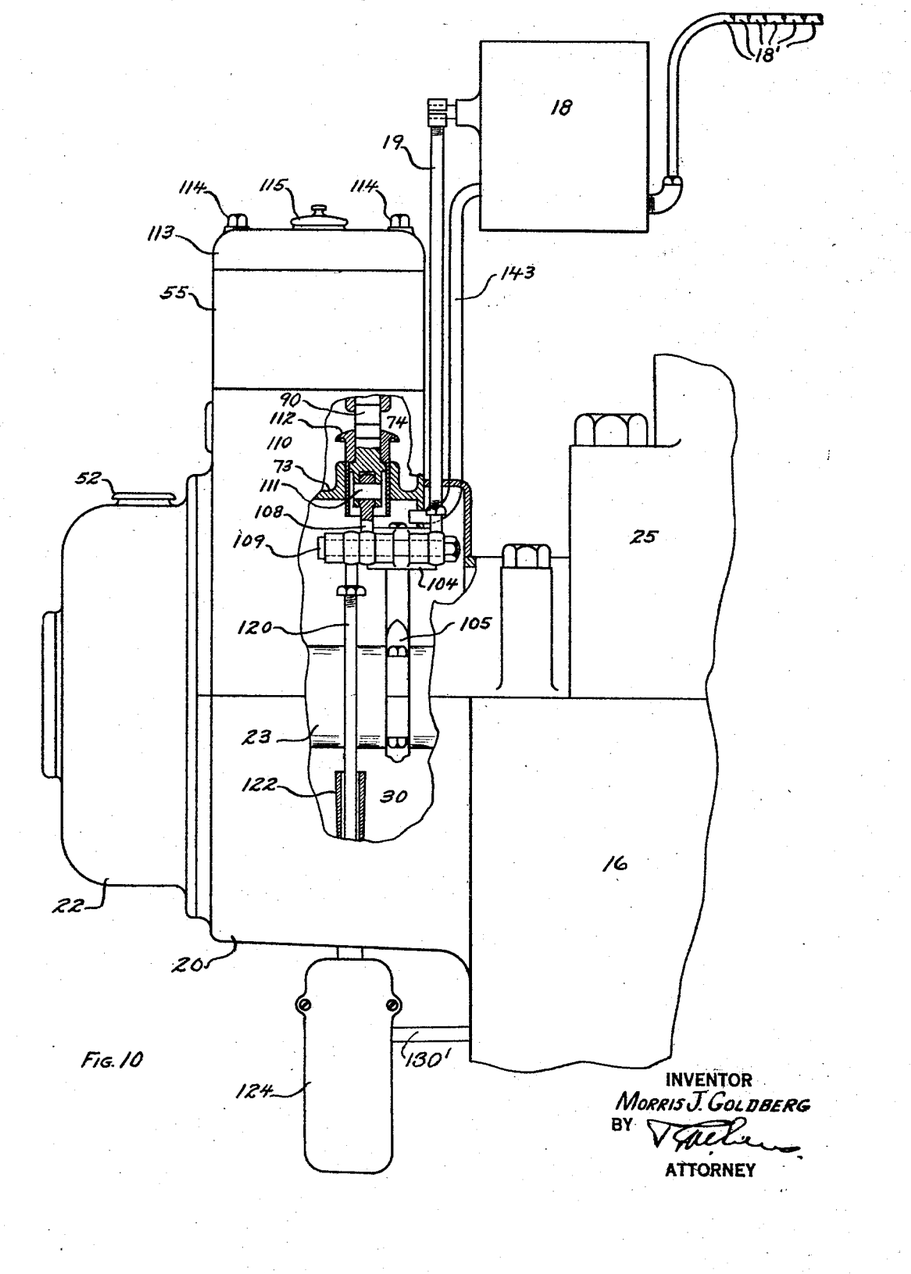
Fig. 10 is a side elevation, partly in section, of the governor and of the engine, and showing the lubricator and oil pump driving arrangement.

Plunger 90 is preferably operated, as best shown in Figs. 5 and 10, by means of eccentric 103 carried by crank shaft 23 and is preferably connected to rocker arm 104 by means of eccentric strap 105 and pin 106. Rocker arm 104 is preferably pivoted on fixed pin 107 and is preferably connected to connecting-rod 108 by means of pin 109. Connecting rod 108 preferably operates plunger 90 through cross-head 110 and pin 111 operating through partition 73. Cross head 110 is preferably provided with an umbrella top 112 so that any leakage past plunger 90 will be deflected into leakage chamber 74 from which it will be drained by opening 75 as previously described, and shown in Fig. 4.

Container 55 is preferably provided with a removable cover 113 held on by any suitable means such as bolts 114. (See Figs. 3, 4 and 5). A lid 115 is preferably placed in cover 113 with a strainer 116 positioned below it for the purpose of filling chamber 56 with fuel at such times when the fuel level in this chamber becomes too low, such as would occur in case the engine should stand for some time without running or when the engine is first started. A gauge glass 117 (Fig. 3), is preferably provided for determining the level of oil in chamber 56.

Figure 9:
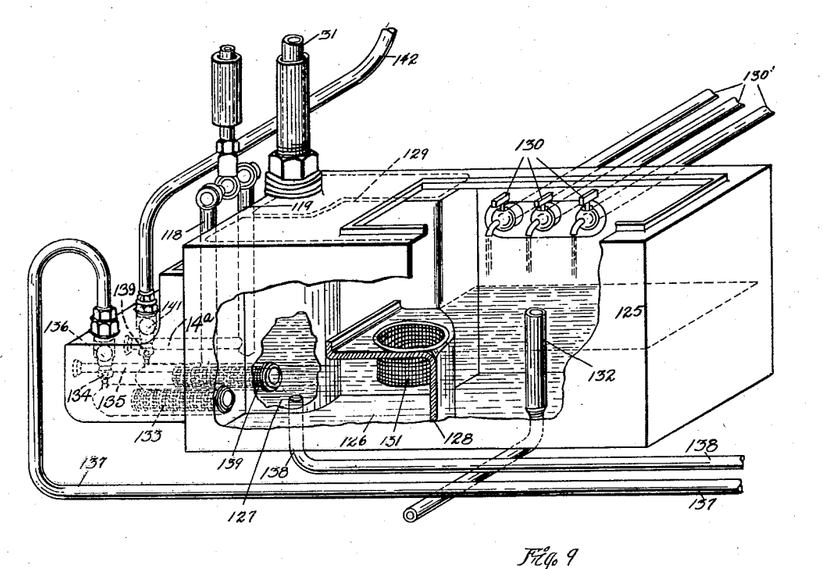
Fig. 9 is a phantom isometric view of an approved form of lubricating oil container.

The lubricating system, hereinafter referred to is described and claimed in my divisional application filed July 1, 1927, bearing Serial No. 202,959. Eccentric 103 also preferably operates lubricating pump plungers 118 and 119 (Figs. 2, 4 and 5) through rocker arm 104, pin 109 and pump-operating rod 120. Rod 120 is connected to plungers 118 and 119 by means of pin 121 and preferably passes out through casing 20, through a tube 122 having its top resident above the normal oil level in reservoir 30. Pump plungers 118 and 119 preferably operate in member 123 removably attached to lubricating oil container 124. 118' represents a suggested form of leakage return passage, (see Fig. 4) for the collection of oil about the top of plungers 118 and 119. Container 124 is preferably divided into three compartments 125, 126, and 127 respectively, (best shown in Fig. 9) by means of partitions 128 and 129. 130 represents petcocks at the end of drain pipes 130' (Figs. 9 and 10) from each of the crank cases, there being preferably one such drain pipe for each crank case. I prefer to employ pet-cocks 130 since it is very often desirable to control the outlet from these drains. The dirty oil drips down from pet-cocks 130 into compartment 125, (see also Fig. 4) rises up over partition 128 and drains down through removable strainer 131, into compartment 126. It will thus be seen that any coarse sediment will tend to settle to the bottom of compartment 125 and that the dirty oil is further cleaned by passing through strainer 131. I prefer to employ an emergency over-flow drain 132 in compartment 125 having its top resident above the normal level of oil in compartment 125 so as to prevent oil from backing up through pet-cocks 130 and into the crank cases 25, should compartments 125 and 126 become filled for any reason. The dirty oil is preferably pumped out of compartment 126 through removable strainer 133, inlet valve 134, (Fig. 4) which may be of any suitable type, into pulsation chamber 135. The oil is preferably forced out of chamber 135 through any suitable type of outlet valve 136 into conduit 137, leading to any suitable reclaiming means such as an oil filter 175, (Fig. 1). The clean oil from the reclaiming means preferably passes into clean oil compartment 127 through conduit 138 (Figs. 1 and 9) and is pumped out of compartment 127 through removable strainer 139 and suction valve 139' into pulsation chamber 140 of plunger 119. From chamber 140 the clean oil is preferably pumped out through any suitable type of outlet valve 141 and conduit 142 into lubricator 18. (See Figs. 1 and 9). An excess of oil is preferably supplied to lubricator 18 by this means and the overflow is preferably drained down into reservoir 30 in casing 20 through conduit 143 (Fig. 10). As previously described, the excess oil in reservoir 30 is preferably drained through constant level drain 31 and this drain is preferably connected to clean oil compartment 127 in container 124. It is evident that I have secured by this means a complete circulating system for the lubricating oil which is simple and positive in its operation and which insures an abundant supply of clean oil at all times. Container 124 is preferably provided with a removable cover or lid 144 (Fig. 4).

Rocker arm 104 is also preferably connected by means of pin 109 to arm 19 which operates lubricator 18 so that the lubricator may be actuated by eccentric 103. Eccentric 103 therefore operates fuel supply pump 90, lubricating pumps 118 and 119, and also lubricator 18. (See Fig. 10).

Figure 6:
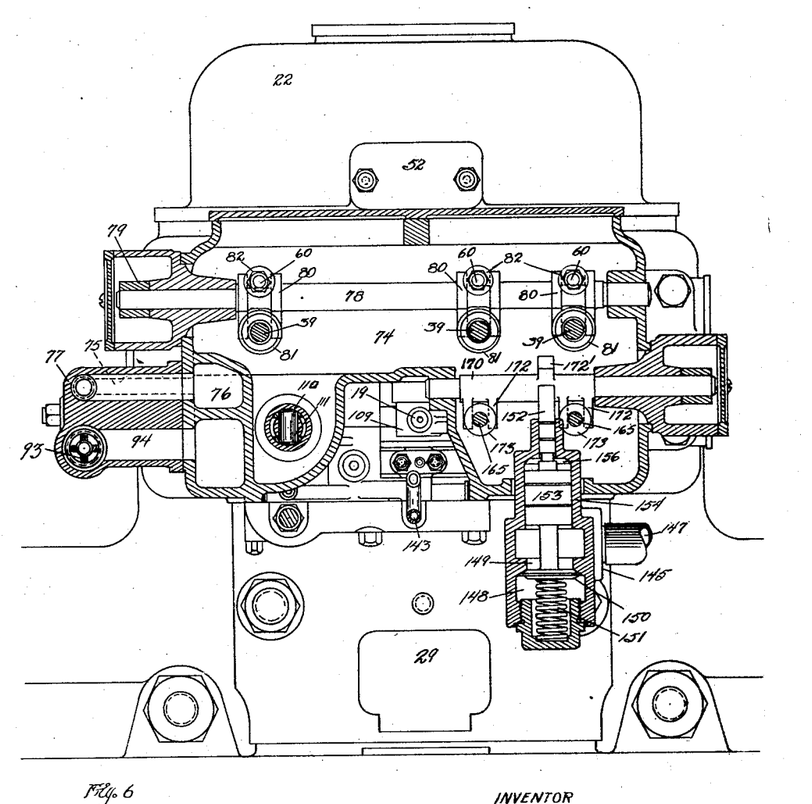
Fig. 6 is a sectional plan view taken along the line 6—6 in Fig. 2.
Figure 7:
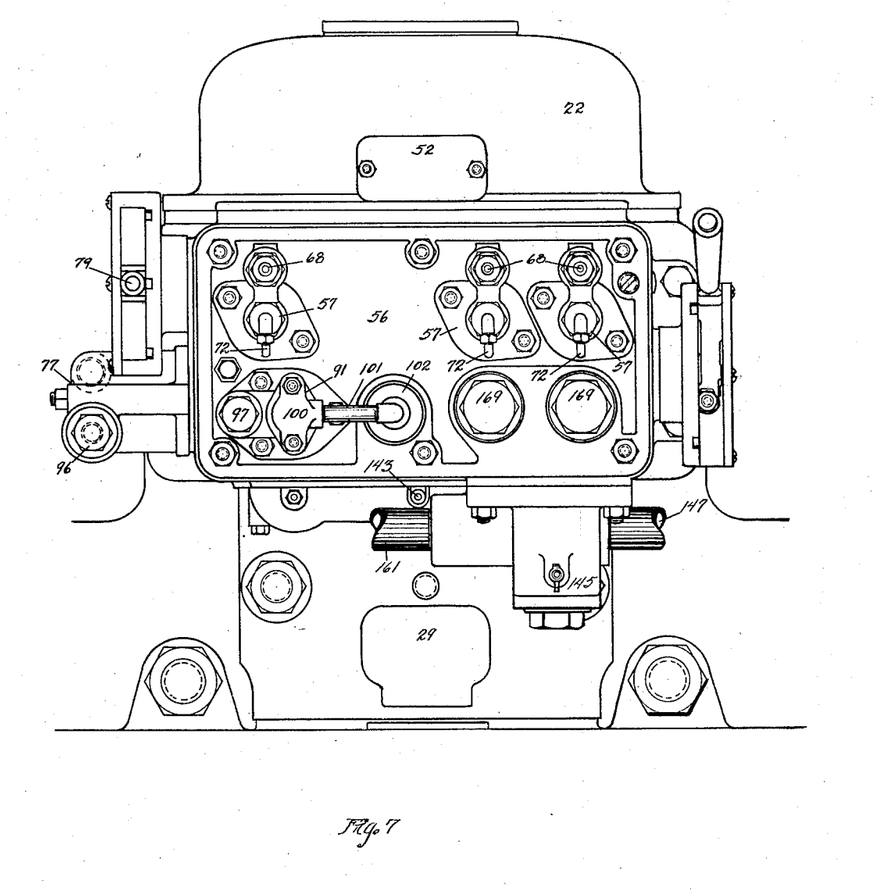
Fig. 7 is a plan view of Fig. 2 with the cover removed.

The starting mechanism hereinafter referred to is described and claimed in detail in my divisional application filed July 1, 1927, bearing Serial No. 202,958. As a means for controlling the starting fluid such as compressed air for example, I prefer to employ a fitting 145 attached to member 146 which, in turn, is preferably attached to casing 20, (Figs. 2, 6 and 7). Fitting 145 preferably has a chamber 147 therein adapted to be connected to a suitable source of compressed air (not shown) and connected to passageway 148 through opening 149 controlled by valve 150. Valve 150 is preferably manually controlled by a mechanism which will be more fully described later, and which is designed to be opened against the pressure of a spring 151. The stem 152 of valve 150 preferably carries an enlargement or piston 153 operating in a cylinder 154. (Fig. 2). An opening 155 through stem 152 and valve 150 preferably connects the end 156 of cylinder 154 with passageway 148, so that one end of piston 153 will be maintained at the same pressure as that on the end of valve 150 in passageway 148. By this means it will be seen that the pressures on the valve will be balanced thereby making the valve easy to move against only the pressure of spring 151. Passageway 148 preferably connects with chamber 157 above valves 158 in member 146. Valves 158 preferably control openings 159 to chambers 160, there being a separate valve and chamber for each cylinder to which it is desired to supply compressed air. Conduits 161 (Figs. 2 and 7), serve to connect chambers 160 with cylinders 15. Valves 158 (see Fig. 5), are preferably operated by cam 162, which may be made integral with eccentric 103 as shown, through rollers 163, operating on members 164 pivoted at 164' and contacting with the ends of push rods 165 at contact points 166. Rods 165 operate valve stems 167 against the pressure of springs 168 held by removable caps 169.

As a means for controlling valve 150 and also for holding valves 158 open excepting when the engine is being started, I prefer to employ a shaft 170 (Fig. 2) operated by lever 171, (Figs. 3 and 5) and carrying tappets 172 and 172', (Fig. 2). During the normal running of the engine lever 171 is so positioned that tappets 172 contact with collars 173 on push rods 165 moving valves 158 upward against springs 168. (See Fig. 2). Members 164 (Fig. 5), will follow the movement of the valves 158 due to the action of springs 174 so that it is evident rollers 163 will be lifted up out of contact with cam 162, thereby saving the cam, rollers, rods and valves from excess wear while the engine is running. When it is desired to start the engine, shaft 170 is turned in a counter-clockwise direction from that shown in Fig. 2, whereby tappets 172 will move out of contact with collars 173 allowing the valves, rods and rollers to drop into their operative positions, and the tappet 172' will contact with the end of valve stem 152, thereby opening valve 150 and permitting the air to be admitted to the proper cylinders as determined by cam 162 and valves 158.

The preceding description has been devoted primarily to the location and nature of parts. Their functions and purposes during the normal running of the engine will be hereinafter briefly set forth in the order of the preceding description of parts. It will of course be understood that the following definite description applies only to suggested particular embodiments of the invention and to a preferred arrangement of parts. This description is inserted merely to clarify the operation and shall not limit the scope of application of the essential ideas of the invention.

*Governor mechanism.*—(Best seen in Figs. 2 and 3.) The drawings indicate an arrangement of the governor adapted for standard rotation. Obviously the same parts may be disposed in a way suitable for reverse rotation, without affecting the principle of operation of the governor and connected parts. The arrangement shown in Figs. 2 and 3 is designed for an engine rotating clock-wise facing the governor end. As engine speed increases, weights 44 are thrown outwardly by centrifugal force. This movement is balanced and opposed by governor springs 49, and is transferred to cam 41, best seen in Fig. 3, through links 46. Cam 41 is in the nature of a sleeve which is capable of being rotated within limits independently of member 35 around which it is mounted. Thus the effect of the speed-induced outward movement of weights 44 is to produce a slight rotation of cam 41 relative to sleeve 35 and engine-shaft 23. This rotation of sleeve or cam 41 effects a control over quantity of fuel injected since the position of cam 41 relative to cam 38 determines the time of closing of suction valve 42 relative to the cycle of operation of pump plunger 39. Cam or sleeve 38 is not rotated relatively to sleeve 35, since 38 is secured to 35 by a key or other suitable means. The effect of governor control is thus to effect a control over quantity of fuel injected; the greatest amount being delivered when the suction valve 42 has just completely closed at the beginning of the upward stroke of injection pump plunger 39. As the engine speed is increased the effect of rotation of cam or sleeve 41 relative to member 35 is to close suction valve 42 some time after injection pump plunger 39 has started on its upward or working stroke, and thus less fuel is delivered.

Figure 8:
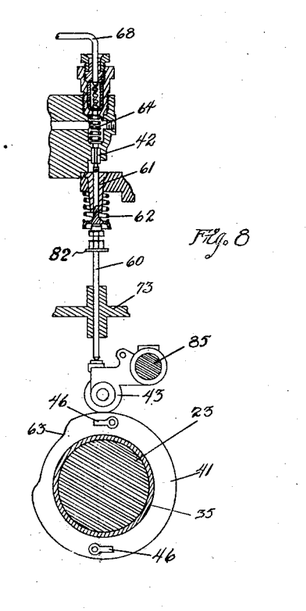
Fig. 8 is a detail sectional view showing an injection pump suction valve and governor operated cam.

*Injection pump mechanism.*—(Best seen in Figs. 2, 4 and 7.) The normal running operation of the injection pump consists in the closing of suction valves 42 as described above, through the agencies of cam or sleeve 41, roller 43, push-rod 60, etc., the return movement being effected by spring 62. With suction valve 42 closed, plunger 39 is forced upwardly on its working stroke by cam 38, roller 40, rod 65, etc. Chamber 59 having been filled with fuel at the opening of valve 42, this fuel is now expelled through discharge valve 67 into pipe 68 leading to the cylinders 15. Valve 67 is automatic. From the shape of cam 41 as shown in Fig. 8 it will be seen that suction valve 42 remains open during the greater part of the injection pump cycle, being closed only during the actual period of injection.

*Fuel supply system.*—(Best seen in Figs. 4, 5 and 7.) The rotation of shaft 23 acting through eccentric 103, strap 105 and rocker 104, imparts a vertical reciprocating movement through rod 108 and cross-head 110 to plunger 90 of the fuel pump. Chamber 92 of the pump is supplied from inlet 92' through strainer 93, thence through chamber 94 to inlet valve 95. Discharge of fuel takes place through discharge valve 98 into passage 99, pipe 101, and strainer 102 thence into chamber 56. The fuel level in chamber 56 is determined by the height of outlet 58 which drains the excess fuel back to the source of the supply through fitting 77. The capacity of the fuel pump is such that an excess of fuel is furnished chamber 56, and the level of fuel is always above the inlet valves 42 and chambers 59 of the fuel injection pumps.

*Lubricating system.*—(Best seen in Figs. 1, 2, 3, 4, 5, 9 and 10.) The various bearing points of the engine proper are oiled by a mechanical force feed lubricator 18, preferably located above housings 20 and 22. The excess of oil regularly furnished lubricator 18 through pipe or conduit 142 from oil pump 119, drains back to housings 20 and 22 which are thereby supplied with an excess of oil to maintain a level to the height of return drain 31, the excess being returned thereby to oil container 124.

The excess of oil furnished the engine proper will gravitate to the separate crank cases, whence it is returned to dirty oil compartment 125 in container 124, by means of separate conduits 130', which are directed from the crank cases to the compartment 125, and are provided at their lower extermities with pet-cocks 130.

Lubrication of all moving parts within housings 20 and 22 is insured by splash and agitation caused by the governor assembly revolving in the oil bath maintained in these housings.

The lubricating oil pumps 118 and 119 (Fig. 2) are actuated by rod 120, which is in turn actuated by rocker 104 and eccentric 103.

The compartments 125 and 126 in container 124 serve to a considerable extent as settling chambers and receiving vats for dirty oil. The dirty oil pump 118 removes the oil from chamber 126 via conduits 137 to an oil filter 175 of suitable form. From the filter 175, through conduit 138 the oil is returned to clean oil chamber 127, whence clean oil pump 119 again delivers the same to the highest point of the system, viz: the mechanical force-feed lubricator 18.

*Air-starting system.*—(Best seen in Figs. 2, 3, 5, 6 and 7.) As this assembly is in operation only when the engine is being put in motion, the function of parts is briefly described under the operation of the apparatus during the starting period.

During the starting period, the operation of the apparatus hereinbefore described is as follows:—

In order to start the engine, lever 79 is oscillated several times between its "run" and "prime" positions. This effects a manual operation of the injection pumps 39 to fill the fuel supply pipes 68 leading to the cylinders. After priming, lever 79 is returned to the neutral or "run" position to permit a full automatic control of the injection pumps as soon as the engine begins to fire.

Air for starting is admitted from the air supply line 47 by placing lever 171 in the "start" position. Thus positioning this lever operates, through means before described, to effect a double purpose, viz: to permit actuation of the air-distributing valves 158 and mechanism, normally held in an inoperative position to prevent wear; and to hold open the controlling valve 150 to admit air to the distributing valves 158. Valves 158 serve to time the admission of air to the cylinders in proper order. They are actuated by cam 162, acting through rollers 163 and rods 165. A preferred arrangement is to effect their return by springs 168 which may be located as shown on top of the valves proper. The engine is then set in motion and ignition takes place as soon as it has attained sufficient rotative speed.

Immediately upon firing, lever 171 is restored to its "run" position. As already described, through the agency of parts 170, 172 and 173, this renders the entire air starting mechanism inoperative and relieves it from wear.

During the regular operation of the engine, when both lever 79 and lever 171 are in their "run" positions, the injection pump mechanism, hence the engine speed is entirely governor controlled. This governor control is accomplished by a variation in time of closing of the injection pump intake valves 42 relative to the stroke of pump plungers 39. This variation is effected by means of the governor mechanism previously described.

To stop the engine it is merely necessary to move lever 79 to its "stop" position. The effect of this operation is to rotate shaft 78 and hence tappets 80 until the latter, by impinging on shoulders 82 on rods 60, raise and hold open the suction valves 42 of the injection pumps. The discharge of fuel by the injection pumps being thus cut off, firing ceases, and the compression of the engine is sufficient to prevent continued rotation.

I claim:—

1. In combination in an internal combustion engine, a governor mechanism, a fuel supply pump, a lubricating pump, a lubricator, an engine shaft, combined means, associated with the shaft, for operating said fuel supply pump, lubricating pump and lubricator, means forming a housing for enclosing, and arranged to permit the splash-oiling of said operating means, and means including said lubricating pump and lubricator, for circulating oil through said housing adjacent said operating means.

2. In combination in an internal combustion engine, a governor mechanism, an air-start valve, operating means for said mechanism and valve, including an engine shaft, means forming an enclosure about, and containing a lubricant for splash-oiling said mechanism and valve operating means, shaft actuated means, including the governor mechanism, for agitating the oil in said enclosure, and an oil circulating system including an oil pump arranged to deliver a stream of oil into said housing adjacent said operating means.

3. In combination in an internal combustion engine, a governor mechanism, an injection pump and operating means therefor, an air-start valve and operating means therefor, means, coacting with said governor, for splash-oiling said operating means, and means for supplying a stream of oil to a point adjacent said operating means, and adapted to cause a circulation of a body of oil about the operating means.

4. In combination in an internal combustion engine, a governor mechanism, a governor controlled fuel valve and operating means therefor, a fuel supply pump, a lubricating oil pump, a lubricator, operating means for said pumps and lubricator; means, including said governor mechanism, for splash-oiling all of said operating means, and means including said oil pump and lubricator for recirculating oil about said pump operating means.

5. In an internal combustion engine, in adjacent relation, a governor mechanism, an injection pump and operating means therefor, a fuel supply pump and operating means therefor, an air-start valve and operating means therefor, means forming a structure enclosing said mechanism, pumps, valve and operating means, and coacting therewith, and with the governor, to provide for their lubrication conjointly, and an oil pump associated with said enclosing structure, a closed oil-circulating system for the engine, including and in circuit with said oil pump and said enclosing structure, said circulating system including a conduit arranged to discharge oil in said enclosing structure adjacent said operating means and governor.

6. In combination in an internal combustion engine, a governor mechanism, a governor controlled fuel valve and operating means therefor, a fuel supply pump and operating means therefor, an air-start valve and operating means therefor, means forming an enclosure for oil, adjacent said mechanism, valves, pump and operating means, certain of said means and mechanism being arranged to agitate the oil in said enclosure, and adapted therewith for the splash-oiling of parts within the enclosure, and means, driven by said fuel pump operating means, connected for supplying a stream of oil to said enclosure adjacent certain of said operating means.

7. In combination in an internal combustion engine, with a common drive shaft, a governor mechanism, a governor controlled injection valve and operating means therefor, an injection pump and operating means therefor, combined stopping means and manually controlled injection pump operating means, an air-start valve and operating means therefor, means forming a housing for said mechanism, valves, pump, operating means and a portion of the drive shaft common thereto, and means for circulating a body of oil within said housing and about certain of said operating mechanism.

8. In combination with the crank case of an internal combustion engine, a governor mechanism, an injection pump and operating means therefor, combined stopping means and manually controlled injection pump operating means, a fuel supply pump, and operating means therefor, a lubricating pump, a force feed lubricator operating means for conjointly actuating the lubricating pump; a housing adapted to carry an oil supply for said mechanism, pumps and means, said housing being separate from, and disposed at one end of the crank case, and below said lubricator, and a conduit from said lubricator to said housing, terminating near certain of said operating means and adapted to cause a movement of oil through said housing.

9. In combination in an internal combustion engine having a crank case, a governor mechanism, a fuel supply pump, a lubricating pump, a lubricator, combined fuel supply pump operating means and lubricating pump and lubricator operating means, an air-start valve and operating means therefor, an enclosure for said mechanism, pumps and operating means, said enclosure containing a supply of oil, and coacting with certain of the parts therein for their splash-lubrication, said enclosure being external to and carried by the crank case, a conduit from said lubricating pump to said lubricator, a passage from said lubricator to said enclosure and disposed to deliver a stream of oil to a point near said operating means, and an oil passage from said enclosure to said lubricating pump.

10. In combination with the crank case of an internal combustion engine, a lubricating pump, a force-lubricator, an enclosed oil reservoir external to the crank case, a governor mechanism, a fuel supply pump, combined fuel supply pump operating means and lubricating pump and lubricator operating means, an air-start valve and operating means therefor, said mechanism, fuel pump and operating means being disposed in said reservoir, splash-lubricating means for said devices, constituted by said governor mechanism operating within said oil reservoir, and an oil passage from said force lubricator, directed to a point near said mechanism and operating means, and adapted to circulate oil through said reservoir.

11. In an internal combustion engine having a crank case, engine accessory devices including a governor mechanism, a governor controlled valve and operating means therefor, an injection pump and operating means therefor, a fuel supply pump, operating means therefor, a lubricating pump, a force-lubricator, operating means operatively connected with the lubricating pump, and a housing for all of said devices, exterior to the crank case and disposed at one extremity thereof, and means including said lubricating pump and lubricator, for circulating oil through said housing.

12. In an internal combustion engine, a governor mechanism, a governor controlled valve and operating means therefor, an injection pump and operating means therefor, a fuel supply pump, a lubricating pump, a lubricator, combined operating means for said fuel supply pump, lubricating pump and lubricator, an air-start valve and operating means therefor, all of said operating means being disposed adjacent said governor mechanism, in a common housing forming an oil reservoir, and adapted to be splash-oiled by said governor mechanism, and means including said lubricating pump, for circulating oil between said housing and lubricator, and through said oil reservoir.

13. In combination in an internal combustion engine, a plurality of engine adjuncts, associated with a common driving shaft, and including a force lubricator, a lubricating pump, governor mechanism, a governor controlled valve and operating means therefor, a sleeve on said shaft, carrying said governor and valve operating means, a fuel supply pump, combined fuel supply pump operating means and lubricating pump and lubricator operating means, an air-start valve and operating means therefor; means forming an oil containing housing for said adjuncts, said governor adapted to agitate the oil in said housing upon other of the said engine adjuncts.

14. In an internal combustion engine, a power shaft, a plurality of engine accessories disposed about, and connected with said shaft, said accessories including a lubricating pump and a force lubricator, a governor mechanism, a governor controlled valve and operating means therefor, a sleeve adjustably mounted on said shaft and carrying the governor mechanism, and said valve operating means, a fuel supply pump, combined fuel supply pump operating means and lubricating pump and lubricator operating means, an air-start valve and operating means therefor; and splash-lubricating means, including said governor mechanism, and common to said operating means.

15. In an internal combustion engine, a crank case, a power shaft extending therefrom, a plurality of engine adjuncts including a lubricating pump, a force lubricator, certain of said adjuncts being grouped about said shaft and including a governor mechanism, a governor controlled fuel valve and operating means therefor, a sleeve mounted on said shaft and carrying said mechanism and valve operating means, an injection pump and operating means therefor, combined stopping means and manually controlled injection pump operating means, a fuel supply pump, combined fuel supply pump operating means and lubricating pump and lubricator operating means, an air-start valve and operating means therefor, means forming a divided enclosure for said adjuncts, exterior to said crank case, the governor mechanism being so related to other of said adjuncts, as to effect splash-oiling thereof within said enclosure, and means including said lubricating pump and lubricator, for supplying a stream of oil into said enclosure near certain of said adjuncts.

16. In combination in an internal combustion engine, a crank case, an oil-containing housing external thereto for engine accessories including a governor mechanism, a governor controlled fuel valve and operating means therefor, an injection pump and operating means therefor, a lubricator, a fuel supply pump, combined fuel supply pump operating means and lubricating pump and lubricator operating means, an air-start valve and operating means therefor; a partition in said housing, between said pumps and operating means, the governor coacting with the oil housing to constitute splash-lubricating means for said operating means, below said partition; and a fuel reservoir for said pumps above the partition, and means including said lubricating pump and lubricator, for circulating oil through the oil housing.

17. In combination in an internal combustion engine, a crank case, a lubricating pump, a force lubricator, a housing structure constituting a splash-oiling reservoir, disposed external to the crank case for certain operating adjuncts of the engine, including a governor mechanism, a driving shaft therefor, a governor controlled fuel valve and operating means therefor, an injection pump and operating means therefor, a fuel supply pump, combined fuel supply pump operating means and lubricating pump and lubricator operating means, an air-start valve and operating means therefor; each of said operating means being actuated by said governor drive shaft, and certain of the engine adjuncts adapted to extend into the oil in the housing and arranged thereby to be splash-oiled, and means including said oil pump, for supplying oil to said lubricator, and an overflow conduit from said lubricator to said housing, terminating near said operating means and adapted to circulate oil through said housing.

18. In an internal combustion engine, a crank case, a housing for engine adjuncts, disposed adjacent one extremity of the engine, said adjuncts within the housing including a governor mechanism, a governor controlled fuel valve and operating means therefor, an injection pump and operating means therefor, a fuel supply pump, combined fuel supply pump operating means and lubricating pump and lubricator operating means, an air-start valve and operating means; a power shaft in the housing for all of said operating means, a lubricating pump and a lubricator exterior to said housing, a lubricating reservoir formed by the housing and coacting with certain of the engine adjuncts to lubricate all of said operating means, means for circulating oil between said lubricating pump and lubricator, and through said reservoir, said means adapted to deliver a stream of oil to said operating means and governor.

19. In an internal combustion engine, operating adjuncts including a lubricating pump, a force feed lubricator and a fuel pump, a driving means common to said adjuncts, comprising an eccentric attached to a power shaft of the engine, a rocker having one end connected with the eccentric, and lubricating pump-operating means, lubricator operating means and fuel supply pump-operating means attached to the other end of said rocker, and means for circulating oil in opposite directions between said lubricating pump and lubricator, and about said eccentric and rocker.

20. In an internal combustion engine, a crank case, a casing external thereto, adapted to contain lubricating oil, a governor and a drive shaft therefor, in said casing, a lubricating oil container below said casing, a fuel oil chamber above said casing, a force feed lubricator above said casing, a fuel supply pump within said chamber, a lubricating pump attached to said container, and arranged to deliver oil to said lubricator, an overflow conduit from the lubricator adapted to deliver a stream of oil to the mechanism within the casing, a rocker within said casing, means operatively connecting the rocker with the governor shaft, said pumps and lubricator being adapted to be operated by said shaft through said rocker and connecting means, and means including the governor, for splash-oiling said rocker and connecting means.

21. In an internal combustion engine having a crank case, the combination of a fuel injection system, an air-start system, and an oil-containing housing external to the crank case, for the operative elements of said systems, a control element for said injection system, disposed within the housing, a governor mechanism in the housing, adapted for automatic control of said injection system through the control element therefor, said governor mechanism being disposed in adjacence to the operative elements of the starting and injection-systems and adapted to agitate the oil in said housing adjacent such elements, and means for introducing a stream of oil into said housing near said operative elements therein, and adapted to effect a circulation of oil through said housing.

22. In an internal combustion engine having a crank case, a housing external to the crank case and adapted to contain oil, a fuel injection system and an air-start system having their operative elements in said housing, an engine shaft in said housing carrying said elements, said elements including an element for operating and controlling said injection system and an element for actuating portions of said air-start system, certain of said operative elements adapted to operate into the oil of said housing, whereby the mechanism of both of said systems is self-oiling, and an oil-circulating pump outside of said housing arranged to deliver a stream of oil to, and circulate oil within said housing, adjacent said operative elements.

23. In an internal combustion engine, including an engine shaft, an auxiliary housing adapted to contain oil and surrounding a portion of said shaft, a fuel injection system and an air-start system, having their operative elements carried by the shaft in said housing, a governor mechanism carried by the shaft within said housing, injection control means carried by said shaft, operatively connecting said governor and said injection system, the operating elements of said systems being arranged to be splash-oiled by the governor mechanism, coacting with the oil in said housing, and means for supplying a stream of oil to said operative elements, and circulating the oil within said housing.

24. In an internal combustion engine, an auxiliary housing, an engine shaft extending into the housing, a fuel injection system and an air-start system, the operating portions of said systems being enclosed by the housing, and carried by said shaft; a governor mechanism within the housing, means carried by said shaft for operatively relating the governor and said injection system, an oil-reservoir in said housing, the governor mechanism and certain of said operating portions adapted to operate in said oil reservoir, and means for causing a flow of oil into said housing adjacent said governor and operating portions of said systems.

25. In an internal combustion engine, an auxiliary housing, an engine shaft in said housing, a fuel injection system and an air-start system, the operating elements of said systems being within the housing, and including timing means for said injection system, said timing means comprising a sleeve on said shaft, a cam on said sleeve, and a governor mechanism in controlling association with said cam; and an oil reservoir in the housing, certain of said timing means adapted to agitate the oil in the reservoir, and means for causing a flow of oil into said housing near said governor and operating elements.

26. In an internal combustion engine, an auxiliary housing, an engine shaft therein, a fuel injection system and an air-start system having their operating elements disposed in the housing, and associated with said shaft, timing means for said systems within the housing and including a plurality of sleeves having cams thereon and adjustably positioned about the end of said shaft, and a governor mechanism associated with one of said sleeves; an oil circulating system including an oil pump in operative connection with said engine shaft within the housing, a reservoir above the housing, an oil reservoir formed by the housing, an oil passage between said reservoirs, directed to the operating elements of the fuel injection and air-start systems, and adapted to cause a circulation of oil in said last named reservoir, said governor mechanism being arranged to operate in said last named oil reservoir, whereby said systems and said mechanism are self-lubricating, and a fuel reservoir associated with the housing, for supplying the injection system.

MORRIS J. GOLDBERG.